United States Patent [19]

Pleickhardt et al.

[11] 4,358,216

[45] Nov. 9, 1982

[54] RESILIENT RETAINING CLIP

[75] Inventors: George C. Pleickhardt, Des Plaines; Philip R. Belisle, Frankfort, both of Ill.

[73] Assignee: Illinois Tool Works Inc., Chicago, Ill.

[21] Appl. No.: 182,888

[22] Filed: Sep. 2, 1980

[51] Int. Cl.³ .............................................. F16B 2/24
[52] U.S. Cl. ..................................... 403/387; 403/397
[58] Field of Search .................... 403/387, 397; 52/489

[56] References Cited

U.S. PATENT DOCUMENTS

| | | | |
|---|---|---|---|
| 1,801,240 | 4/1931 | Schaffert | 52/489 |
| 2,307,653 | 1/1943 | Wright . | |
| 2,406,315 | 8/1946 | Blocher | 403/387 |
| 2,467,604 | 4/1949 | Tinnerman et al. | 403/387 |
| 3,307,315 | 3/1967 | Schneller | 403/387 X |
| 3,393,488 | 7/1968 | Schneller . | |
| 3,456,412 | 7/1969 | Decombas . | |
| 4,141,191 | 2/1979 | Aarons . | |

Primary Examiner—Andrew V. Kundrat
Attorney, Agent, or Firm—Jerold M. Forsberg; Thomas W. Buckman; Jack R. Halvorsen

[57] ABSTRACT

A sheet metal spring clip for securing deck flooring having an underlying channel in juxtaposed relation to a supporting beam in generally perpendicular relation. The beam and channel each having flanges which extend in opposite directions from the point of contact between the two members. The clip includes means adapted to engage both flanges and an intermediately disposed spring loaded portions capable of elongation whereby the engaging portion grasp said flanges under tension.

9 Claims, 3 Drawing Figures

U.S. Patent    Nov. 9, 1982    4,358,216
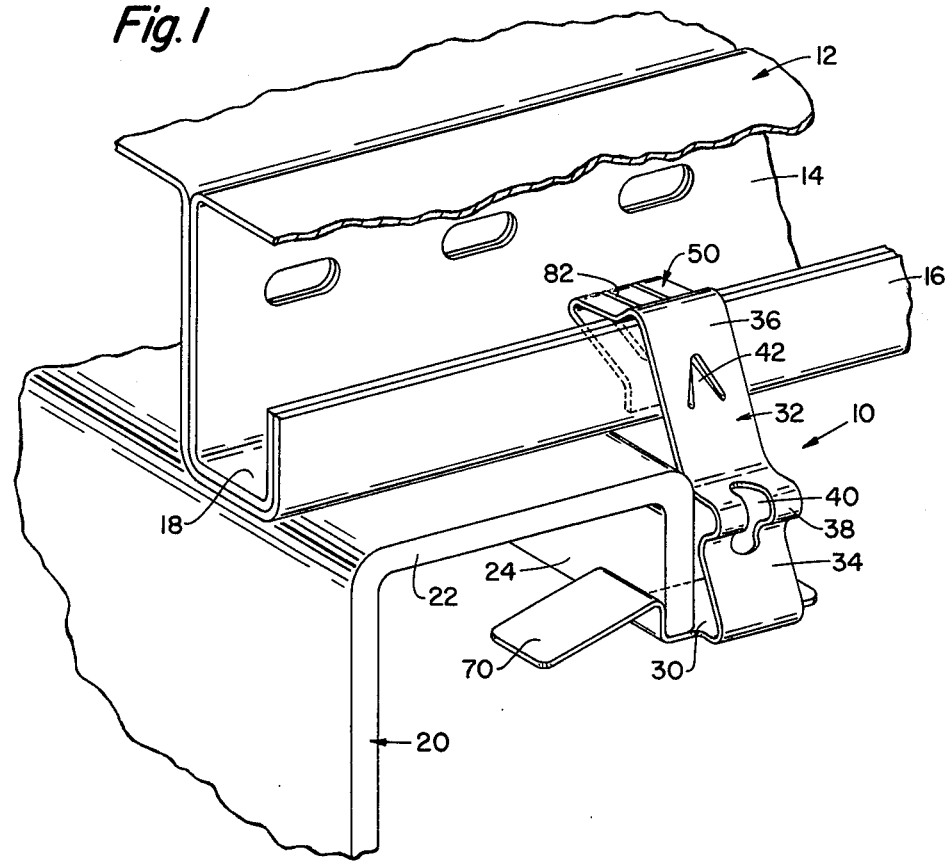
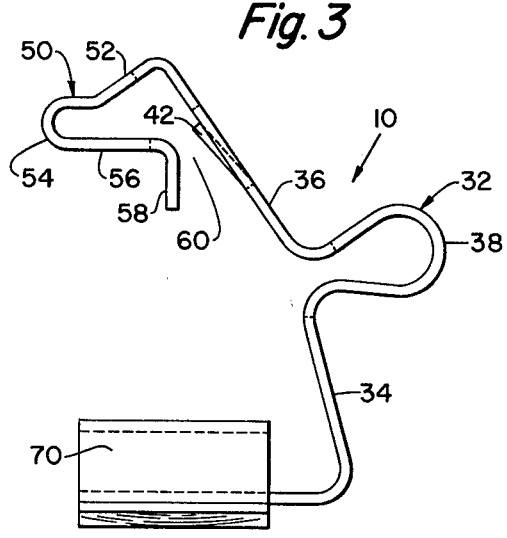
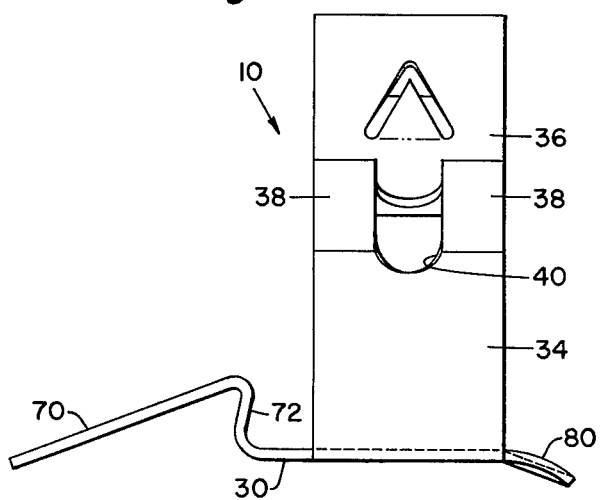

RESILIENT RETAINING CLIP

This invention relates to a clip for use with structures where metallic decks are supported by C beam or other types of reinforcing means. The art is replete with various clips for use in such structures and generally are directed to specific embodiments where the clip is designed to conform to particular configurations of beam or deck structure. For example see the patents to A. H. Schaffert U.S. Pat. No. 1,801,240 issued Apr. 14, 1931; G. C. Wright U.S. Pat. No. 2,307,653, issued Jan. 5, 1943; J. W. Schneller U.S. Pat. No. 3,393,488, issued July 23, 1968; R. Decombas U.S. Pat. No. 3,456,412, issued July 22, 1969 and R. J. Aarons U.S. Pat. No. 4,141,191, issued Feb. 27, 1979. These patents generally represent the state of the art in showing clips which are snap fastened, nailed in place, or require screw thread operation for pulling the two beam or supported members together. The earlier patents were generally fabricated from soft sheet material which could be bent to final assembled relationship. Since they could initially be bent it is a fact that they could be bent in the opposite direction which would result in a loosened condition resulting in insecure mounting of the one member relative to the other.

SUMMARY OF INVENTION

The present invention relates to a sheet metal spring clip which can be readily snapped into engagement with one flange of deck flooring channel means and slid laterally into snap engagement with a flange on the underlying beam support. An advantage of the present invention is that a clip according to its teachings includes a spring loaded member capable of ensuring continued engagement between the two flanges by placing the intermediate portion in tension. Minor variations in tolerance as well as minor variations in movement will be accepted by the clip and compensated for by the spring means interposed between those means grasping the flanges.

An additional advantage of the present invention is that a clip constructed according to its teachings can be readily installed thereby minimizing the high cost of labor used to assemble such structures.

Still another object of the present invention is to provide a clip which can be readily fabricated from known sheet metal materials and quickly heat treated to provide the spring characteristics desired.

Other objects will become apparent to those skilled in the art when the specification is read in conjunction with the attached drawings.

BRIEF DESCRIPTION OF THE DRAWINGS

FIG. 1 is a partial sectional view in perspective of an assembly of deck flooring to a supporting beam utilizing a clip according to the teachings of the present invention;

FIG. 2 is a front elevational view of a clip of the type contemplated herein; and FIG. 3 is a side elevational view of the clip shown in FIG. 2, as viewed from the left hand side of FIG. 2.

DETAILED DESCRIPTION

Referring now to the drawing wherein similar parts are designated by similar numerals, a clip (10) of the type contemplated by this invention can be utilized with deck flooring (12) having an underlying channel (14) and including a reversely bent upwardly directed flange (16) and an intermediate foot (18) adapted to rest in perpendicular relation to a supporting member such as a C beam (20). The C beam includes an upper flat portion (22) for support of the foot (18) of the channel (14) and a downwardly directed flange (24) extending in the opposite direction from the flange (16).

The clip (10) includes a body (30) generally planar in configuration and having extending upwardly along one edge thereof an angularly disposed elongated spring means (32) which generally is angled into overlying relation to the body (30). The spring means (32), in this embodiment, includes a pair of spaced elongated elements (34) and (36) interconnected by one or more reversely bent loop portions (38). In the present invention there are a pair of loops (38) separated by an intervening slot (40) to provide additional resiliency to the spring loops (38). An engaging barb or tang (42) is struck from the upper portion (36) and extends inwardly overlying the body (30) with its sharpened end directed away from the body (30), for purposes best set forth hereinafter.

At the upper free end of portion (36) is a generally resilient hook member (50) which includes a downwardly extending segment (52), a reversely bent U-shaped portion (54) with the lower limb (56) thereof extending toward the upper portion (36) and terminating in a flange (58) generally perpendicular to the body (30). The flange (58) and the upper portion (36) forming in the space between them a throat for acceptance of a flange of the type designated by the numeral 16. It will be appreciated that the tang or barb (42) extends into said throat and is capable of engaging a planar member such as the flange (16) introduced into the throat, generally designated by the numeral 60.

Referring again to the body (30) a secondary element in the form of a cam surface (70) and an abrupt shoulder (72) extends laterally from the body (30) along a portion of an edge adjacent to the edge carrying the spring means (32) of clip (10). In most instances, such as the embodiment described herein, this ramp or cam surface (70) and the shoulder (72) are generally perpendicular to the spring means (32). On the opposite side from the ramp and shoulder (70–72) is a lateral extension (80) having a gently curved surface for engagement and manipulation by an operator.

In use of the present invention the clip (10) has its generally hook shaped portion (50) slid over the flange (16), with flange (16) extending into the throat (60) and bottoming at the juncture of upper portion (36) and first segment (52). The abutment flange (58) bears against one surface of flange (16) while the barb (42) engages the opposite surface for preventing unauthorized removal thereof. The spring portion (54) will open up the throat (60) to accept a wide variety of flange thicknesses and yet maintain a firm grip thereon. If desired the resilient portion (54) can be slotted as seen at 82 in FIG. 1 to enhance its resiliency. The clip (10) is then slid laterally until the cam surface (70) engages the free edge of flange (24) of the supporting beam. The body can be flexed at its juncture with the spring means (32) by depression on the operator pad (80) until the cam surface under-rides the flange and the flange (24) drops into engagement with the shoulder (72). The spring loops (38) will permit extension of the spring means (32) with its associated portions (34) and (36) to thereby place the retaining means defined by hook (50) and shoulder (72) to be constantly maintained in tension by the spring means for elongated portion (32). This clip will respond to variations in tolerances between the spacing of the free edges of flanges (16) and (24) as well as to absorb shock loads between the deck flooring (12) and the supporting beam (20). It can be readily installed with the operator pad assisting in deflection of the cam surface (70) during the lateral shifting of the clip (10) relative to flange (16) of the deck flooring (12).

While other embodiments will be apparent to those skilled in the art, the attached claims should be read in the broad sense to include fastening means for grasping oppositely directed beams that are angularly disposed relative to one another and maintained in juxtaposed relation by interconnecting elongatable spring means.

I claim:

1. A one piece spring material clip adapted for use in retaining two flanged members in generally perpendicular juxtaposed relation including a body, angularly disposed spring means extending in a first direction away from said body along a first edge thereof and terminating in first means for grasping a flange of a first member, said angularly disposed spring means includes a generally elongated portion and resilient means maintaining said elongated portion in tension, second means for grasping a flange of the second member integral with and extending laterally from said body along a second edge thereof, said second means facing generally in opposition to said first means.

2. A clip of the type claimed in claim 1 wherein said first means is generally hook-shaped.

3. A clip of the type claimed in claim 2 wherein said hook-shaped means includes an open throat for accepting said first flange and defined on one side by a portion of said spring means and defined on the other side by a complimentary abutment means for engaging one surface of said flange while means carried by said spring means engages the oppositely facing surface of said flange.

4. A clip of the type claimed in claim 3 wherein said abutment means includes a generally flat portion interconnected to the free end of said spring means by a resilient spring formed by a reversely bent portion.

5. A clip of the type claimed in claim 1 wherein said elongated portion is defined by two spaced planar members interconnected by a U-shaped resilient sheet material means.

6. A clip of the type claimed in claim 5 in combination with two members having flange means extending in opposite directions and disposed in generally perpendicular relation wherein said hook means engages one flange and laterally extending shoulder means spaced from said hook means a predetermined distance engages said second flange, said predetermined distance being less than the distance between the free edges of the oppositely facing flanges whereby said elongated portion and its associated resilient means are extended and placed in tension to thereby maintain said two members in tight spring retained juxtaposed oriented relation.

7. A clip of the type claimed in claim 1 wherein said second grasping means includes a cam surface terminating in an abrupt shoulder whereby the flange of said second member will ride up said cam surface and deflect said second means until said flange reaches said shoulder and said second means will return toward its initial position.

8. A clip of the type claimed in claim 7 wherein said cam and shoulder are integral with said body and said body will be deflected angularly relative to said spring means.

9. A clip of the type claimed in claim 8 wherein said body further includes operator means for assisting in deflection of said spring means during installation on said first and second members.

* * * * *